(12) United States Patent
Augereau

(10) Patent No.: US 8,264,621 B2
(45) Date of Patent: Sep. 11, 2012

(54) VIEWING DEVICE FOR WIDESCREEN COMPRISING MEANS OF CORRECTING THE DOUBLING OF IMAGES DUE TO SAID WIDESCREEN

(75) Inventor: Philippe Augereau, Cestas (FR)

(73) Assignee: Thales, Neuilly sur Seine (FR)

( * ) Notice: Subject to any disclaimer, the term of this patent is extended or adjusted under 35 U.S.C. 154(b) by 463 days.

(21) Appl. No.: 12/629,727

(22) Filed: Dec. 2, 2009

(65) Prior Publication Data

US 2010/0141854 A1    Jun. 10, 2010

(30) Foreign Application Priority Data

Dec. 5, 2008   (FR) ...................................... 08 06832

(51) Int. Cl.
    *N04N 5/64* (2006.01)
(52) U.S. Cl. ........................................................ 348/837
(58) Field of Classification Search .................... 348/837
    See application file for complete search history.

(56) References Cited

U.S. PATENT DOCUMENTS

| 8,142,030 B2 * | 3/2012 | Bowden et al. ............... 353/82 |
| 2004/0135742 A1 | 7/2004 | Weber et al. |

FOREIGN PATENT DOCUMENTS

EP    0 893 726 A    1/1999
* cited by examiner

*Primary Examiner* — David Czekaj
*Assistant Examiner* — Tracy Li
(74) *Attorney, Agent, or Firm* — LaRiviere, Grubman & Payne, LLP

(57) ABSTRACT

The general technical field of the invention is that of viewing devices mounted on vehicles and comprising a display whose image is reflected by the windscreen of the vehicle, making it possible to superimpose the displayed image on the outside world. One of the major problems with this type of display is that the windscreen gives, by reflection, two non-superimposed doubled images. The basic principle of the invention is that the initial image is such that the combination of the first reflected image and the second image reflected by the windscreen gives a "clean" or "ideal" perceived image without any offsets. To perform this function, an image is generated on the display that comprises, obviously, the "ideal" image, but also a succession of offset images comprising negatives of the "ideal" image so that the resultant sum of the first reflected image and of the second reflected image includes no more than the "ideal" image. Obviously, the principle of the invention can be applied to simple displays or to displays comprising an image collimated to infinity or to a great distance.

3 Claims, 3 Drawing Sheets

VIEWING DEVICE FOR WIDESCREEN COMPRISING MEANS OF CORRECTING THE DOUBLING OF IMAGES DUE TO SAID WIDESCREEN

PRIORITY CLAIM

This application claims priority to French Patent Application Number 08 06832, entitled Dispositif De Visualisation Pour Pare-Brise Comprenant Des Moyens De Correction Du Dédoublement D'Images Dû Audit Pare-Brise, filed on Dec. 5, 2008.

FIELD OF THE INVENTION

The general technical field of the invention is that of viewing devices comprising an optical mixer or combiner making it possible to superimpose the displayed image on the outside world. The combiner then provides two optical functions: on the one hand, it reflects the image originating from the display of the viewing device to the user and on the other hand it transmits the image coming from the external landscape to this same user. These devices are mainly mounted on motor vehicles or aircraft. For a certain number of applications, the optical mixer is the windscreen of the car or the canopy of the aircraft. The optical device is thus simplified and the cost of the optical mixer is saved.

BACKGROUND OF THE INVENTION

However, the windscreens initially manufactured to protect the driver or the pilot from the wind, bad weather, temperature differences or impacts with elements suspended in the air were by no means designed to allow for good quality image reflections. Whatever the projection mode used, collimated or not, the optical combiner must have a single reflection surface of good optical quality. However, the windscreens are made up of at least two dioptres, an input face and an output face that cause, when the light flux is reflected on the windscreen, a doubling of the observed image. This phenomenon becomes all the more pronounced with thicker windscreens, with poor parallel alignment between the dioptres and with curved windscreens. This phenomenon is illustrated in FIG. 1 which represents a viewing device comprising a display 1 which displays, for example, the number "123". The two reflections on the dioptres 21 and 22 that form the windscreen 2 give two offset images of the number "123" represented in black and grey lines in FIG. 1. If the reflection coefficient of the external dioptre 22 is not negligible compared to that of the internal dioptre 21, these two offset images are seen by the user 3 and, obviously, the second image disturbs the perception of the first image. FIG. 2 represents the images generated $I_{INIT}$ and seen $I_{VUE}$ by a user after reflection on the windscreen, in the case of a white square on a black background. For reasons of clarity, the offset between the images reflected by the windscreen is chosen to be equal to one and a half times the side of the square so as to separate the different images without overlap. The top part of the FIG. 2 represents, on the right, the image generated on the display and, on the left, the variation of the light intensity IL along an axis x passing through the centre of the square. The bottom part of FIG. 2 represents, on the right, the image seen $I_{VUE}$ by the user and, on the left, the variation of the light intensity along an axis x passing through the centre of the image. The image of the square that is seen is doubled. The doubling of the image can be expressed in mathematical form. Thus, let $I_{INIT}(x,y)$ be an image generated on the display in a system of coordinates (x,y) and by denoting the image perceived by the user as $I_{VUE}$, the images reflected by the dioptres of the windscreen as $I_{REF1}$ and $I_{REF2}$, the following relations apply:

$$I_{REF1} \approx I_{INIT}$$

$$I_{REF2} \approx k.I_{INIT}(x+dx, y+dy)$$

$$I_{VUE} \approx I_{REF1} + I_{REF2}$$

k is the relative reflection coefficient of the second image relative to the first image, k being strictly less than 1, dx and dy being the offsets introduced by the second dioptre of the windscreen.

This image doubling is now the major problem in viewing devices, also called HUD, for "head-up display", that utilize projection onto a windscreen. The compensation methods are very costly and mostly require adaptation or even the use of dedicated windscreens, which, in most consumer applications, is a major obstacle.

Nowadays, in order to eliminate or strongly compensate the doubling of the image on the windscreen, the equipment manufacturers mainly use two different techniques which are:

use of a reflective film or "patch".

The aim in this case is to prioritize a single reflection on the windscreen, that of the first dioptre, that is to say the internal face of the windscreen. This patch has to be completely parallel to the face on which it is deposited in order to ensure uniformity of reflection. The major drawback with these patches is chromatically filtering the transmission of the light flux, which is translated by a modified perception of the external colours. The outside scene is then darker in the area of the patch than in the rest of the field and major colour modifications may also be observed. Depending on the patch production techniques (thin-film deposition, etc.) the high cost may be a handicap to this technique.

a local modification of the geometry of the windscreen

Another technique involves modifying the structure of the windscreen. Windscreens are then obtained that are dedicated to the HUD function. The technique then lies in the modification of a plastic insert, made of "PVB" for example, in order to render the windscreen locally prismatic. The doubling of images is not eliminated, but it is made sufficiently great for the user to be able to perceive only a single image. The drawback with this solution is the need to produce a specific windscreen, dedicated to the HUD function and implement a complex and costly manufacturing method. This technical solution was envisaged notably by the company "Dupont" under the name of "Wedge". This technique then requires windscreens to be replaced when the customer chooses the HUD option. This operation is particularly complex and costly to implement in the aeronautical field. Close collaboration is then needed between the designer of the projector and that of the windscreen in order to develop the system as a whole.

SUMMARY OF THE INVENTION

Unlike the devices of the prior art, the inventive device does not seek to eliminate the spurious image due to the second reflection on the windscreen. On the contrary, this spurious image is used. The basic principle of the invention is that the initial image is such that the combination of the first reflected image and of the second reflected image gives a "clean" or "ideal" perceived image without any offsets. To perform this function, an image is generated on the display comprising, obviously, the "ideal" image, but also a succession of offset images comprising negatives of the "ideal" image so that the resultant sum of the first reflected image and of the second reflected image comprises no more than the "ideal" image. Obviously, the principle of the invention can be applied to simple displays or to displays comprising an image collimated to infinity or to a great distance.

More specifically, the subject of the invention is a first viewing device comprising at least one display and means of generating an initial image $I_{INIT}$ on said display, the image being referenced in a reference plane (x,y), said device being intended to be mounted in a vehicle and used with a windscreen, the arrangement of the viewing device being such that, the device being mounted in the vehicle, the image is reflected on an area of the windscreen before being perceived by a user, said windscreen including at least two reflecting dioptres, an internal dioptre and an external dioptre, the internal dioptre giving, from the initial image $I_{INIT}$, a first reflected image $I_{REF1}$, the external dioptre giving, from the initial image $I_{INIT}$, a second reflected image spatially offset from the first reflected image $I_{REF2}$, the offsets being denoted (dx,dy) in the plane (x,y), the relative reflection coefficient of the second image relative to the first image being equal to k, k being strictly less than 1, the image seen by the user being the sum of these two reflected images, characterized in that the initial image $I_{INIT}$ generated on the display is equal to a succession of offset images, each image being alternately the "positive" and the "negative" of an ideal image $I_{IDEAL}$, such that $$I_{INIT} = I_O + \sum_{i=0}^{N} (-k)^i \cdot I_{IDEAL}(x + i \cdot dx, y + i \cdot dy),$$

being an integer number varying between 0 and N, N being equal to or greater than 1, $I_{IDEAL}$ being referenced in the reference plane (x,y), $I_O$ being an image of uniform luminance such that the luminance level of $I_{INIT}$ does not include any negative term, so that the image seen is substantially equivalent to the image $I_{IDEAL}$.

Another subject of the invention is a second viewing device comprising at least one display, means of generating an initial image $I_{INIT}$ on said display, the image being referenced in a reference plane (x,y) and means of collimating the initial image, said means having an optical power P, said device being intended to be mounted in a vehicle and used with a windscreen, the arrangement of the viewing device being such that, the device being mounted in the vehicle, the collimated image P.$I_{INIT}$ is reflected on an area of the windscreen before being perceived by a user, said windscreen including at least two reflecting dioptres, an internal dioptre and an external dioptre, the internal dioptre giving, from the collimated image P.$I_{INIT}$, a first reflected image $I_{REF1}$, the external dioptre giving, from the initial image $I_{COL}$, a second reflected image angularly offset from the first reflected image $I_{REF2}$, the offsets denoted (dα,dβ) corresponding to offsets (dx,dy) in the plane (x,y), the relative reflection coefficient of the second image relative to the first image being equal to k, k being strictly less than 1, the image seen by the user being the sum of these two reflected images, characterized in that the initial image $I_{INIT}$ generated on the display is equal to a succession of offset images, each image being alternately the "positive" and the "negative" of an ideal image $I_{IDEAL}$, such that $$I_{INIT} = I_O + \sum_{i=0}^{N} (-k)^i \cdot I_{IDEAL}(x + i \cdot dx, y + i \cdot dy),$$

i being an integer number varying between 0 and N, N being equal to or greater than 1, $I_{IDEAL}$ being an image referenced in the reference plane (x,y), $I_O$ being an image of uniform luminance such that the luminance level of $I_{INIT}$ does not include any negative term, so that the collimated image seen is substantially equivalent to the image P.$I_{IDEAL}$.

In both cases, the ideal image $I_{IDEAL}$ can be an anti-aliased image.

There are many advantages with this invention, compared to the solutions usually implemented. These include:

Absence of additional elements. There is no longer any need to add an extra optical element of "patch" type or any local optical treatment or to modify the structure of the windscreen, which is particularly constraining;

Saving in terms of cost, by transferring the resolution of the problem to the level of graphic generation which is very easy to modify. Thus, in the case of a "WHUD" standing for "windscreen head-up display" collimated to a near distance, of the order of one to two meters, the system proves very simple to implement. The device comprises a single digital screen of "LCD" type with no additional optics. Such a solution further makes it possible to obtain larger fields of view than the conventional solutions;

Very wide adaptability. The method allows simple adjustments, in production, for example, thus making it possible to correct the nominal doubling associated with the dioptres of different types of windscreen, but also reduce the doubling provoked by poorly-controlled parallel alignment of the windscreen. From the industrial point of view, this method makes it possible to propose a global solution without modifying the components of the current cockpits, minimizing the exchanges and interactions between different equipment manufacturers. The method can be adapted to numerous WHUD systems whether collimated to infinity or not, on different types of windscreen, flat or curved.

BRIEF DESCRIPTION OF THE DRAWINGS

The invention will be better understood and other benefits will become apparent from reading the description that follows given by way of non-limiting example, and from the appended figures in which.

MORE DETAILED DESCRIPTION

As has been seen, the problem of the doubling of images can be expressed in mathematical form. Three simple equations are sufficient. They are reviewed below:

$I_{REF1} \approx I_{INIT}$ $I_{REF2} \approx k.I_{INIT}(x+dx, y+dy)$ $I_{VUE} \approx I_{REF1} + I_{REF2}$ The core of the invention is to construct an initial image comprising additional images so that, after reflection on the two dioptres of the windscreen, these additional images on the one hand are perfectly juxtaposed with the spurious images due to the second dioptre and on the other hand perfectly compensate them. These additional images must therefore have two characteristics. They must be offset so as to be perfectly superimposed on the spurious images. They must be the "photographic negative" of the spurious images so as to cancel them as completely as possible.

In a more mathematical way, and in the first simple case where the device comprises only a display with no collimation device, the following can be written:

$$I_{INIT} = I_O + \sum_{i=0}^{N} (-k)^i \cdot I_{IDEAL}(x + i \cdot dx, y + i \cdot dy),$$

i being an integer number varying between 0 and N, N being equal to or greater than 1,
$I_{IDEAL}$ being the image intended to be seen, $I_{IDEAL}$ is referenced in the reference plane (x,y),
$I_O$ being an image of uniform luminance such that the luminance level of $I_{INIT}$ does not include any negative term, so that the image seen is substantially equivalent to the image $I_{IDEAL}$. The latter constraint requires modifications of mean values in the image and a certain reduction in the image contrast.

In this case, by applying this equation to the previous three equations, we obtain:

$$I_{REF1} \approx I_O + \sum_{i=0}^{N} (-k)^i \cdot I_{IDEAL}(x + i \cdot dx, y + i \cdot dy)$$

$$I_{REF2} \approx k \cdot I_O(x + dx, y + dy) + \sum_{i=0}^{N} (-k)^{i+1} \cdot I_{IDEAL}(x + i \cdot dx, y + i \cdot dy)$$

$$I_{VUE} \approx I_{REF1} + I_{REF2} \approx I_O + k \cdot I_O(x + dx, y + dy)) + I_{IDEAL}(x, y)$$

This expression is not quite exact. In practice, there still remains a spurious image whose light intensity is attenuated by the factor $(-k)^{N+1}$. It is therefore easy, by choosing N to be sufficiently high, to attenuate this residual image as much as is required. Thus, if k is 50% and if N is 4, the attenuation factor is 3%.

Consequently, the image seen is quite substantially equal to the ideal image, to within a constant, which is the aim sought.

Figure 1:
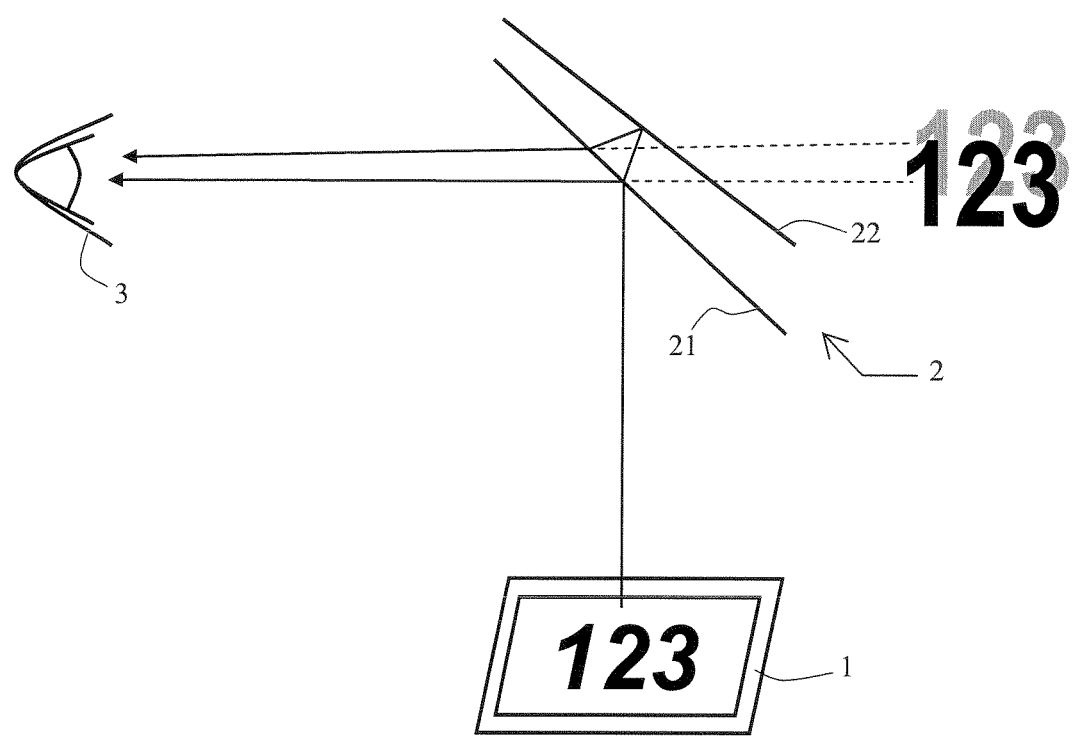
FIG. 1, already commented on, represents a viewing device according to the prior art.
Figure 2:
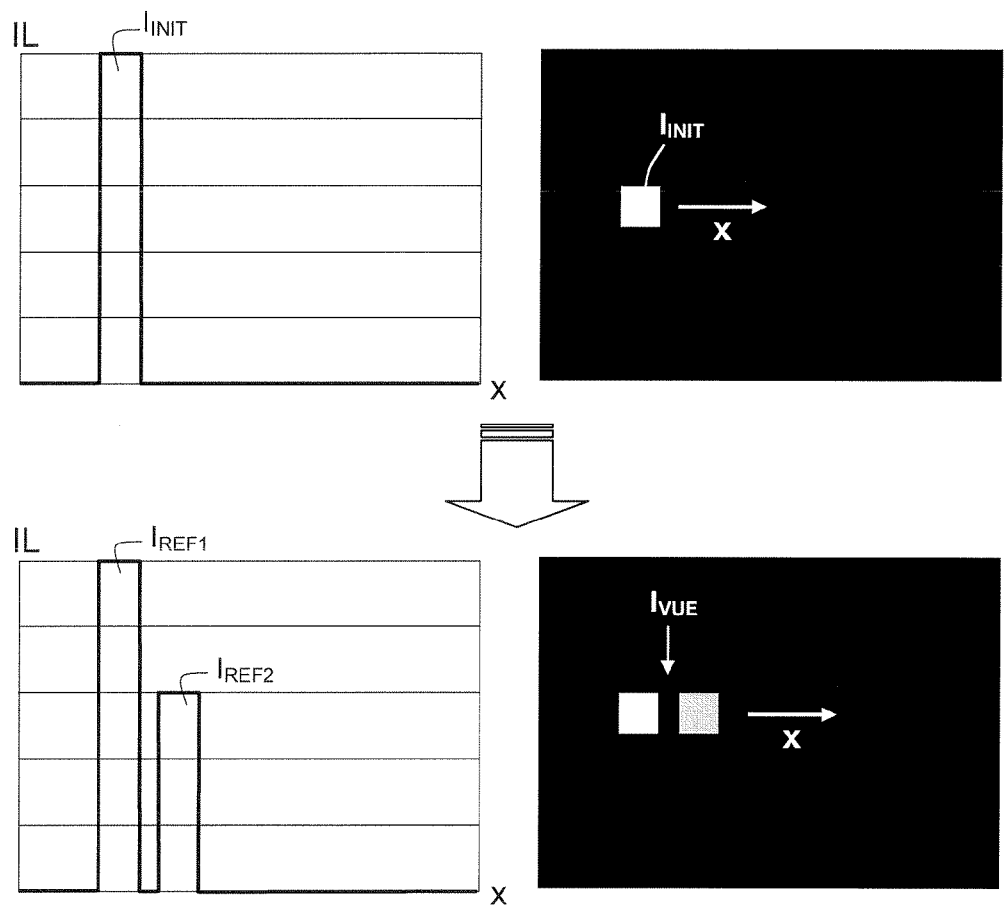
FIG. 2, already commented on, represents the images generated and seen by a user after reflection on the windscreen in the case of the device of FIG. 1.
Figure 3:
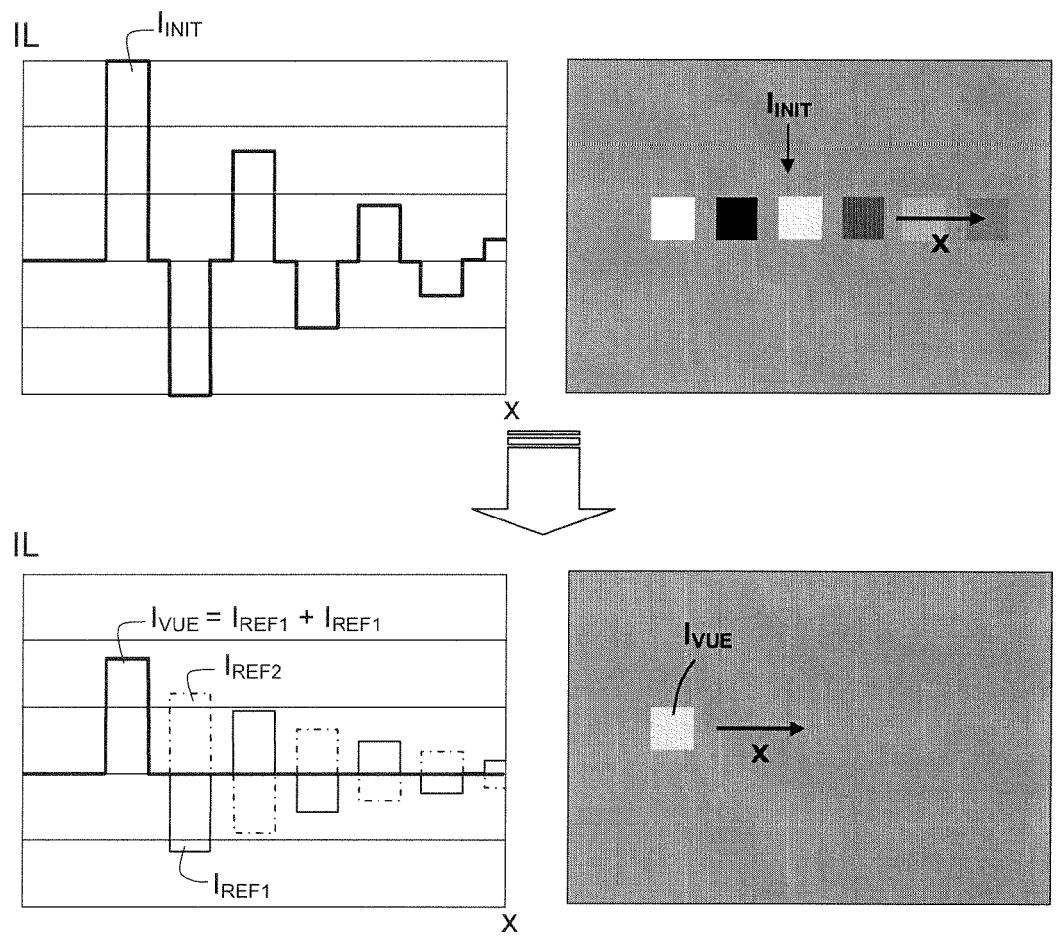
FIG. 3 represents the images generated and seen by a user after reflection on the windscreen in the case of a device according to the invention.

FIG. 3 illustrates this principle. It is constructed like FIG. 2. FIG. 3 represents the images generated $I_{INIT}$ and seen $I_{VUE}$ by a user after reflection on the windscreen, in the case of a white square on a black background, the offset between the images being equal to one and a half times the side of the square so as to separate the different images without overlap. The top part of FIG. 3 represents on the right, the image generated $I_{INIT}$ on the display and, on the left, the variation of the light intensity IL along an axis x passing through the centre of the square. The bottom part of FIG. 3 represents, on the right, the image seen $I_{VUE}$ by the user and, on the left, the variation of the light intensity IL along an axis x passing through the centre of the image. The image of the square seen is not doubled. However, it is no longer possible to obtain a white square on a black background. A light grey square on a dark grey background is obtained. It is obvious that, when the coefficient k is not too high, this drop in contrast is not very sensitive whereas the perception of the doubled image remains perceptible, including with low values of k.

Of course, the invention can be adapted to the devices including collimation means, these means having an optical power P. The principle is the same. It is then sufficient for the angular offsets (P.dx,P.dy) of the image seen through the collimation device to correspond to the offsets (dα,dβ) of the windscreen. This adaptation poses no production problems to those skilled in the art.

Since the invention is based on the recursive addition and subtraction of images, it is obviously necessary for the use of this device to accurately characterize the luminosity levels for each of the red, green and blue colour levels. This characterization makes it possible to compensate the non-linear aspect generally observed on digital screens of LCD type.

Preferentially, it is possible to use so-called anti-aliased images with the blurred contours making it possible to provide a wider tolerance to the quality of image generation, thus erasing the slight local doublings.

In the case of a wide visual field, it is possible for the doubling and the attenuation coefficient k to be able to vary within the image. It is then necessary to apply the image compensation method with locally adjusted values or with values that change continuously in the image.

What is claimed is:

1. Viewing device comprising at least one display (1) and means of generating an initial image $I_{INIT}$ on said display, the image being referenced in a reference plane (x,y), said device being intended to be mounted in a vehicle and used with a windscreen (2), the arrangement of the viewing device being such that, the device being mounted in the vehicle, the image is reflected on an area of the windscreen before being perceived by a user, said windscreen including at least two reflecting dioptres, an internal dioptre (21) and an external dioptre (22), the internal dioptre giving, from the initial image $I_{INIT}$, a first reflected image $I_{REF1}$ the external dioptre giving, from the initial image $I_{INIT}$, a second reflected image spatially offset from the first reflected image $I_{REF2}$, the offsets being denoted (dx,dy) in the plane (x,y), the relative reflection coefficient of the second image relative to the first image being equal to k, k being strictly less than 1, the image seen by the user being the sum of these two reflected images, wherein the initial image $I_{INIT}$ generated on the display is equal to a succession of offset images, each image being alternately the "positive" and the "negative" of an ideal image $I_{IDEAL}$, such that $$I_{INIT} = I_O + \sum_{i=0}^{N} (-k)^i \cdot I_{IDEAL}(x + i \cdot dx, y + i \cdot dy),$$

i being an integer number varying between 0 and N, N being equal to or greater than 1, $I_{IDEAL}$ being referenced in the reference plane (x,y), $I_O$ being an image of uniform luminance such that the luminance level of $I_{INIT}$ does not include any negative term, so that the image seen $I_{VUE}$ is substantially equivalent to the image $I_{IDEAL}$.

2. Viewing device comprising at least one display, means of generating an initial image $I_{INIT}$ on said display, the image being referenced in a reference plane (x,y) and means of collimating the initial image, said means having an optical power P, said device being intended to be mounted in a vehicle and used with a windscreen, the arrangement of the viewing device being such that, the device being mounted in the vehicle, the collimated image P.I$_{INIT}$ is reflected on an area of the windscreen before being perceived by a user, said windscreen including at least two reflecting dioptres, an internal dioptre and an external dioptre, the internal dioptre giving, from the collimated image P.I$_{INIT}$, a first reflected image I$_{REF1}$, the external dioptre giving, from the initial image I$_{INIT}$, a second reflected image angularly offset from the first reflected image I$_{REF2}$, the offsets denoted (dα,dβ) corresponding to offsets (dx,dy) in the plane (x,y), the relative reflection coefficient of the second image relative to the first image being equal to k, k being strictly less than 1, wherein the image seen by the user being the sum of these two reflected images, the initial image I$_{INIT}$ generated on the display is equal to a succession of offset images, each image being alternately the "positive" and the "negative" of an ideal image I$_{IDEAL}$ such that $$I_{INIT} = I_O + \sum_{i=0}^{N} (-k)^i \cdot I_{IDEAL}(x + i \cdot dx, y + i \cdot dy),$$

being an integer number varying between 0 and N, N being equal to or greater than 1, I$_{IDEAL}$ being an image referenced in the reference plane (x,y), I$_O$ being an image of uniform luminance such that the luminance level of I$_{INIT}$ does not include any negative term, so that the collimated image seen I$_{VUE}$ is substantially equivalent to the image I$_{IDEAL}$.

3. Viewing device according to one of claim 1 or 2, wherein the ideal image I$_{IDEAL}$ is an anti-aliased image.

* * * * *